US012174372B2

(12) United States Patent
Sadok et al.

(10) Patent No.: US 12,174,372 B2
(45) Date of Patent: Dec. 24, 2024

(54) DISPLAY SYSTEM FOR TRANSPORTATION NETWORKS

(71) Applicant: tDisp Inc., Santa Clara, CA (US)

(72) Inventors: Mokhtar Mansour Sadok, Santa Clara, CA (US); Samia Mhadheb Sadok, Santa Clara, CA (US)

(73) Assignee: tDisp Inc., Santa Clara, CA (US)

( * ) Notice: Subject to any disclaimer, the term of this patent is extended or adjusted under 35 U.S.C. 154(b) by 0 days.

(21) Appl. No.: 17/725,963

(22) Filed: Apr. 21, 2022

(65) Prior Publication Data

US 2022/0242307 A1  Aug. 4, 2022

Related U.S. Application Data

(63) Continuation of application No. 17/260,647, filed as application No. PCT/US2020/028241 on Apr. 15, 2020, now Pat. No. 11,312,293.

(60) Provisional application No. 62/841,861, filed on May 2, 2019.

(51) Int. Cl.
*H04W 4/44* (2018.01)
*B60Q 1/50* (2006.01)
*G02B 27/01* (2006.01)
*G06Q 10/02* (2012.01)

(52) U.S. Cl.
CPC .......... *G02B 27/01* (2013.01); *B60Q 1/5037* (2022.05); *B60Q 1/543* (2022.05); *B60Q 1/545* (2022.05); *G02B 27/0101* (2013.01); *G06Q 10/02* (2013.01); *H04W 4/44* (2018.02); *G02B 2027/0141* (2013.01)

(58) Field of Classification Search
CPC ........ B60Q 1/503; B60Q 1/543; B60Q 1/545; B60Q 1/5037; G02B 27/0101; G02B 2027/0141; G02B 2027/0198; G02B 27/01; H04W 4/44; H04W 4/021; H04W 4/90; G06Q 10/02; G06Q 30/0643; G06Q 50/30; G06Q 50/40; G07C 5/006; G07C 5/008

See application file for complete search history.

(56) References Cited

U.S. PATENT DOCUMENTS

| 9,494,938 | B1 * | 11/2016 | Kemler | G01C 21/3415 |
| 9,904,375 | B1 * | 2/2018 | Donnelly | G05D 1/00 |
| 2011/0059693 | A1 * | 3/2011 | O'Sullivan | G08G 1/123 |
| | | | | 455/41.1 |
| 2012/0137257 | A1 * | 5/2012 | Lalancette | G06Q 30/00 |
| | | | | 715/846 |
| 2015/0348408 | A1 * | 12/2015 | Demisse | G08G 1/017 |
| | | | | 340/933 |
| 2017/0103426 | A1 * | 4/2017 | Peretz | G09G 5/22 |

(Continued)

*Primary Examiner* — Daniell L Negron
(74) *Attorney, Agent, or Firm* — Downs Rachlin Martin PLLC

(57) ABSTRACT

A display device controlled via a smart phone (preferably using an TNC App) to display content selected by a requesting rider (e.g., code, symbol, the rider name, or a photo) in a clear and visible way to the waiting rider is a convenient method to identify the rider's designated vehicle instead of trying to search through model, color, and license plates of approaching vehicles as they enter a pickup area (e.g., airport designated area). The selected content is displayed on a display unit on the designated vehicle, and is transmitted to the display unit via a server associated with the designated vehicle using a secure protocol.

8 Claims, 3 Drawing Sheets

(56) References Cited

U.S. PATENT DOCUMENTS

| | | | |
|---|---|---|---|
| 2018/0268209 A1* | 9/2018 | Sato | G06V 10/25 |
| 2019/0139091 A1* | 5/2019 | He | B60Q 1/503 |
| 2019/0232860 A1* | 8/2019 | Ferrone | B60Q 1/2611 |

* cited by examiner

DISPLAY SYSTEM FOR TRANSPORTATION NETWORKS

FIELD OF THE INVENTION

The present invention generally relates to display systems. In particular, the present invention is directed to a Display System for Transportation Networks.

BACKGROUND

With the expansion of Transportation Network Companies (TNC), such as Uber and Lyft, particularly in densely populated areas, there is a need to minimize the time needed for a passenger to meet and confirm his/her designated vehicle by the TNC at the agreed upon address. This need will become even more urgent with the deployment of self-driving cars and the absence of a human in the car (i.e., driver) to communicate with the passenger and confirm his/her ride and vehicle.

Currently, when someone orders a ride via a TNC App in a smart phone, the process typically goes through the following steps:
  a. Select a destination address;
  b. Select/confirm the pickup area;
  c. Select the ride type (e.g., taking an individual ride or sharing a ride); and
  d. Confirm the number of seats to be used.

The TNC App would then designate a vehicle to pick up the passenger. While waiting to be picked up, the passenger can follow the movement of the designated vehicle on its way to the pickup area through the passenger's smart phone App.

To recognize the designated vehicle at the arrival time and area, the rider is given certain information via the TNC App including the vehicle license number, vehicle make and model, vehicle color, and driver name. This information is typically enough for the passenger to recognize the designated vehicle approaching the pickup area in normal conditions and settings. However, there are situations and settings in which it would be hard, if at all possible, for the passenger to identify his/her designated vehicle based on the information provided by the TNC App. These situations include but not limited to:
  a. Very busy areas such as airports or downtown areas with many similar vehicles and/or riders waiting for a similar service.
  b. Reduced visibility conditions such as low light, foe, or rain, in which case the vehicle license number or the car model and color may not be distinguishable or visible to the rider particularly when it is difficult to predict where and how the vehicle will approach the pickup area. This situation can create safety concerns for the rider if the rider confuses the designated vehicle with another vehicle, which can result (and has resulted) in the rider getting into a non-designated vehicle.
  c. When the request for a ride is initiated by someone other than the rider. In these circumstances, the rider may not have all the needed information in a timely manner to identify the approaching designated vehicle.
  d. When the rider has difficulty seeing or reading the car license number because of medical or other conditions.

SUMMARY OF THE DISCLOSURE

A system for displaying individualized user information on a designated vehicle is provided that includes a user interface, wherein a prospective rider enters a ride request and a display content into the user interface, and wherein the display content is associated with and specific to the prospective rider and the ride request. A display device is included on the designated vehicle, the display device having a unique identification number. A server is associated with the designated vehicle and a client associated with the display device. The server is in communication with the client and, when the ride request results in the designated vehicle being selected and accepted to fulfill the ride request, the client receives the display content and requests the display device to display the display content. The display device, upon receiving the request, sends the client a challenge including the unique identification number to match, and, if the client matches the challenge, the display device displays the display content such that the display content is viewable from outside the designated vehicle for at least a portion of a time period between when the ride request is entered and when the ride request is fulfilled.

Additionally or alternatively, the display content is a name of the prospective rider.

Additionally or alternatively, the display content is an image of the prospective rider.

Additionally or alternatively, the display device is an LED display matrix and the LED display matrix displays scrolling text of the display content.

Additionally or alternatively, the display device includes a HUD and a mirror configured to reflect the content from the HUD such that the content is visible to and oriented properly for observers outside the designated vehicle.

Another system for displaying information from a vehicle is provided that includes a display device attached to a designated vehicle, wherein information displayed on the display device is visible to observers outside the designated vehicle. A transportation application is linked to the display device, the transportation application includes a set of instructions for receiving a ride request from a user, receiving content for display from the user, wherein the content is associated with and specific to the user and the ride request, selecting the designated vehicle to fulfill the ride request based on the ride request, and displaying the content on the display device of the selected designated vehicle for at least a portion of a time period between the receiving of the ride request and fulfilling the ride request.

Additionally or alternatively, the content is a name of the user.

Additionally or alternatively, the content is an image of the user.

Additionally or alternatively, the display device is connected to a client and includes a unique identification number, and wherein the client verifies the content received from the user prior to the displaying of the content on the display device.

Additionally or alternatively, the system further includes a server associated with the designated vehicle, wherein the server receives the content from the user and communicates the content to the client.

Additionally or alternatively, the server is a smart phone associated with an operator of the designated vehicle.

Additionally or alternatively, the display device is an LED display matrix and the LED display matrix displays scrolling text of the content.

Additionally or alternatively, the display device includes a HUD and a mirror configured to reflect the content from the HUD such that the content is visible to and oriented properly for observers outside the designated vehicle.

In another system for displaying individualized user information on a designated vehicle, the system includes a user interface, wherein a prospective rider enters a ride request and a display content into the user interface, and wherein the display content is associated with and specific to the prospective rider and the ride request. A display device is on the designated vehicle, wherein, when the ride request results in the designated vehicle being selected and accepted to fulfill the ride request, the display device displays the display content such that the display content is viewable from outside the designated vehicle for at least a portion of a time period between when the ride request is entered and when the ride request is fulfilled.

Additionally or alternatively, the display content is a string generated by the prospective rider.

Additionally or alternatively, the display content is an image of the prospective rider.

Additionally or alternatively, the display device is an LED display matrix and the LED display matrix displays scrolling text of the display content.

Additionally or alternatively, the display device includes a HUD and a mirror configured to reflect the display content from the HUD such that the display content is oriented properly for observers outside the designated vehicle.

Additionally or alternatively, the display device is visible to a passenger in the designated vehicle and displays information related to the fulfillment of the ride request during the fulfillment of the ride request.

Additionally or alternatively, the information related to the fulfillment of the ride request includes one or more of the following: estimated ride duration, next destination of the vehicle, and traffic conditions.

Additionally or alternatively, the display device is a screen mounted inside the vehicle and designed and configured to display images, photos, and videos to the prospective rider when the prospective rider is outside the vehicle.

Additionally or alternatively, commercial material specifically tailored towards the prospective rider is shown on the display device as the vehicle approaches a prearranged pickup area.

Additionally or alternatively, the display device further displays commercial materials visible to anyone outside the designated vehicle in accordance with parameters associated with a location of the designated vehicle.

Additionally or alternatively, the display device further displays vehicle maintenance information including level of fuel or charge and tire pressure.

Additionally or alternatively, the display device further displays information related to accidents and unusual events experienced by the designated vehicle during a selected period of time.

Additionally or alternatively, the display device further displays maintenance and distress information about other vehicles in a network of vehicles associated with a transportation network company, wherein the maintenance and distress information is broadcast by the transportation network company to selected vehicles to inform personnel to take actions regarding a distressed vehicle, and wherein some of the maintenance and distress information includes distressed car model, color, license plate number, current location, and distress type.

A method of displaying information to facilitate fulfillment of a user-requested ride includes receiving a ride request from a prospective rider, receiving content for display from the prospective rider, wherein the content is associated with and specific to the prospective rider and the ride request, selecting a vehicle to fulfill the ride request based on the ride request, and displaying the content on a display device on the selected vehicle for at least a portion of a time period between the receiving of the ride request and fulfilling of the ride request, wherein the display device displays the content only upon verifying a source of the content.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

Figure 1:
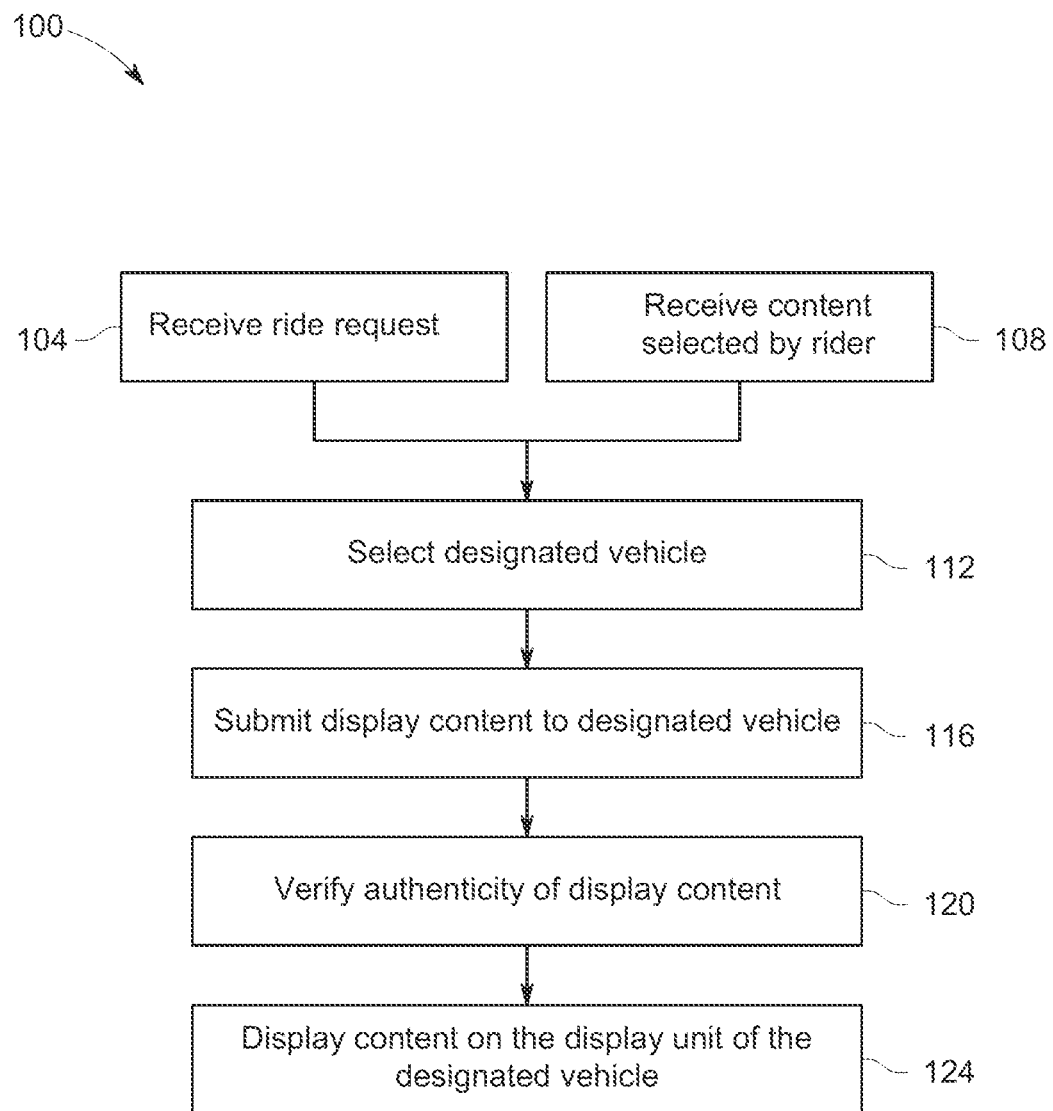
FIG. 1 is a process diagram for displaying individual rider content in accordance with an embodiment of the present invention.

In the present invention, individualized rider content can be requested by a rider requesting a ride and displayed on a vehicle that has been designated to fulfill the ride request. This provides a safer and more convenient way for the rider to recognize an approaching designated vehicle at the pickup location. The designated vehicle may display the name of the rider (and/or a code, symbol, or photo) in a clear and visible way to those outside the designated vehicle in accordance with the present invention instead of leaving the burden on the rider to identify his/her designated vehicle. Even in normal conditions, it is more convenient for the rider to look for his/her designated vehicle via his/her displayed name, code, symbol, or a photo of his/her choice.

The solution provided by the present invention may also be useful when the rider's smart phone is not functional around the pickup area, such as when the battery is dead or when there is no network coverage around the pickup area.

A display device controlled via a smart phone (preferably using the same TNG App) to display a selected text (i.e. code, symbol, the rider name, or a photo) in a clear and visible way to the waiting rider is a convenient method to identify the rider's designated vehicle instead of trying to search through model, color, and licenses of approaching vehicles as they enter the pickup area (e.g., airport designated area).

Examples of display methods include an array of LED matrices that can display custom text or images that are easily readable/recognizable from a distance in day or night lighting conditions. Such a display device may be placed behind the windshield inside the vehicle or on front or on top or in any position inside or outside the vehicle that is easily spotted by a person outside the vehicle. If placed outside the vehicle, such a display tool should be protected against inclement weather conditions such as rain and snow.

A display system based on LED matrices may be programmed via a smartphone to display custom text in specific way (e.g., scrolling or blinking). These display systems may be controlled at a distance via wireless protocol such as Bluetooth and can be powered locally via a set of batteries (rechargeable or otherwise) or can be attached to the 12-volt battery in the vehicle via a suitable cable.

Display devices are available in the market and can be modified to meet the requirements of this invention. Different colors of the display elements (e.g. LED) can be used along with various ways of displaying those colored elements (e.g., blinking, scrolling, dropping) provide riders with distinguishable capabilities to recognize their designated vehicles under all conditions.

Other tools, such as Head Up Display (HUD) units that are designed to provide visual information to the driver, including texting and navigation information, may be modified or augmented to display information directed outside the vehicle in accordance with this invention.

One way of displaying the HUD information to the outside world is via a mirror that reflects the content of the HUD such that it is visible outside the vehicle. Physical placement and mounting orientation of the mirror and the HUD display device will be coordinated to insure the clear and correct display of the HUD content to people outside the vehicle.

Such a display tool may be controlled via a smart phone (preferably in coordination with the TNC App) to display a selected text (e.g., the rider name) or other relevant information.

With the availability of external display, additional steps may be added to the vehicle ordering process, including requesting the rider to confirm displaying his/her name (or any other text selected by the rider) to facilitate the identification of the approaching vehicle when entering the pickup area. The rider may be offered the choice to provide details for this step during the registration process, after which the display preference could be a default condition, unless the rider changes the initial setting.

With advances anticipated in display technology, it will be commercially viable to display an image, or a photo uploaded by the rider to his/her TNC account. As images and photos are easier and faster to be recognized by the brain, displaying an image or a photo selected by the rider may be a preferred way for many riders to recognize their designated vehicle in the pickup areas. One way of displaying images and photos is on screens attached to the vehicle (inside or outside). The image, photo, or video can be selected by the rider via his/her smart phone TNC app. Such content can be delivered to the screen via the Internet and the TNC wireless network where the designated vehicle (or the vehicle driver smart phone) is connected.

Other information of interest to the rider can also be shown on the display system if desired by the rider. As the vehicle approaches the pickup area, the TNC may display to the rider the estimated time of his/her trip, next destination and stop of the vehicle, traffic conditions, and the like. With some pre-arrangement with the rider, the TNC may broadcast on the display system some specific commercial material tailored towards the rider as the vehicle approaches the pickup area. Similarly, when the rider is inside the vehicle, the TNC may broadcast some commercial materials to the public using the display system.

The display system may be used to display vehicle maintenance materials to its handlers such as level of fuel (or electricity charge for electric vehicles), levels of tire pressure, and any information related to accidents and unusual events that the vehicle experienced during daily rides.

The display device may also be used to display maintenance and distress information about other vehicles in the network. Such information can be broadcasted by the TNC to the display devices of certain vehicles to inform specific group of people (e.g., in a maintenance shop or traffic management site) to take actions regarding such a distressed vehicle. Some of the information may include the distressed car model, color, license plate number, current car location, distress type, number of passengers affected, etc.

In an embodiment, a method, such as method 100 outlined in FIG. 1, allows a requesting rider to select content to be displayed on a vehicle designated to pick up the rider. The rider or user enters into a TNC App user interface or similar a ride request that is received by the TNC App at step 104 and a content display request at step 108. The ride request is used to select a designated vehicle at step 112. When the operator of the designated vehicle agrees to fulfill the ride request, the requested content is sent to the designated vehicle at step 116. At step 120, the authenticity of the requested content is verified, and if verified, the requested content is shown on a display of the designated vehicle at step 124. In this way, the rider is able to control what is displayed on the vehicle designated to pick up the rider.

Figure 2:
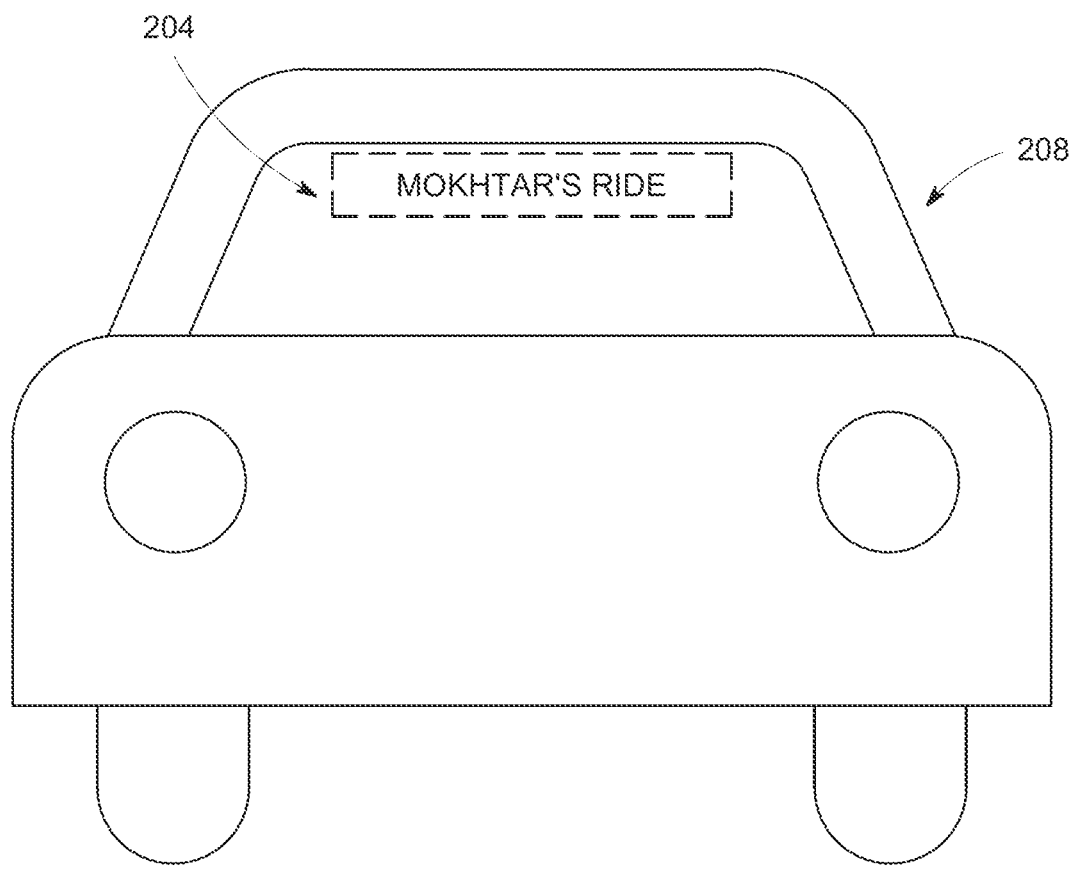
FIG. 2 is a schematic depiction of a display board on a designated vehicle in accordance with an embodiment of the present invention.

An example of individualized rider information being displayed is shown in FIG. 2, in which a display 204 shows individualized user content (e.g., "MOKHTAR'S RIDE") on a selected designated vehicle 208 in a manner that allows people outside the vehicle, such as a person waiting for a ride at a designated location, to see and comprehend the content.

Figure 3:
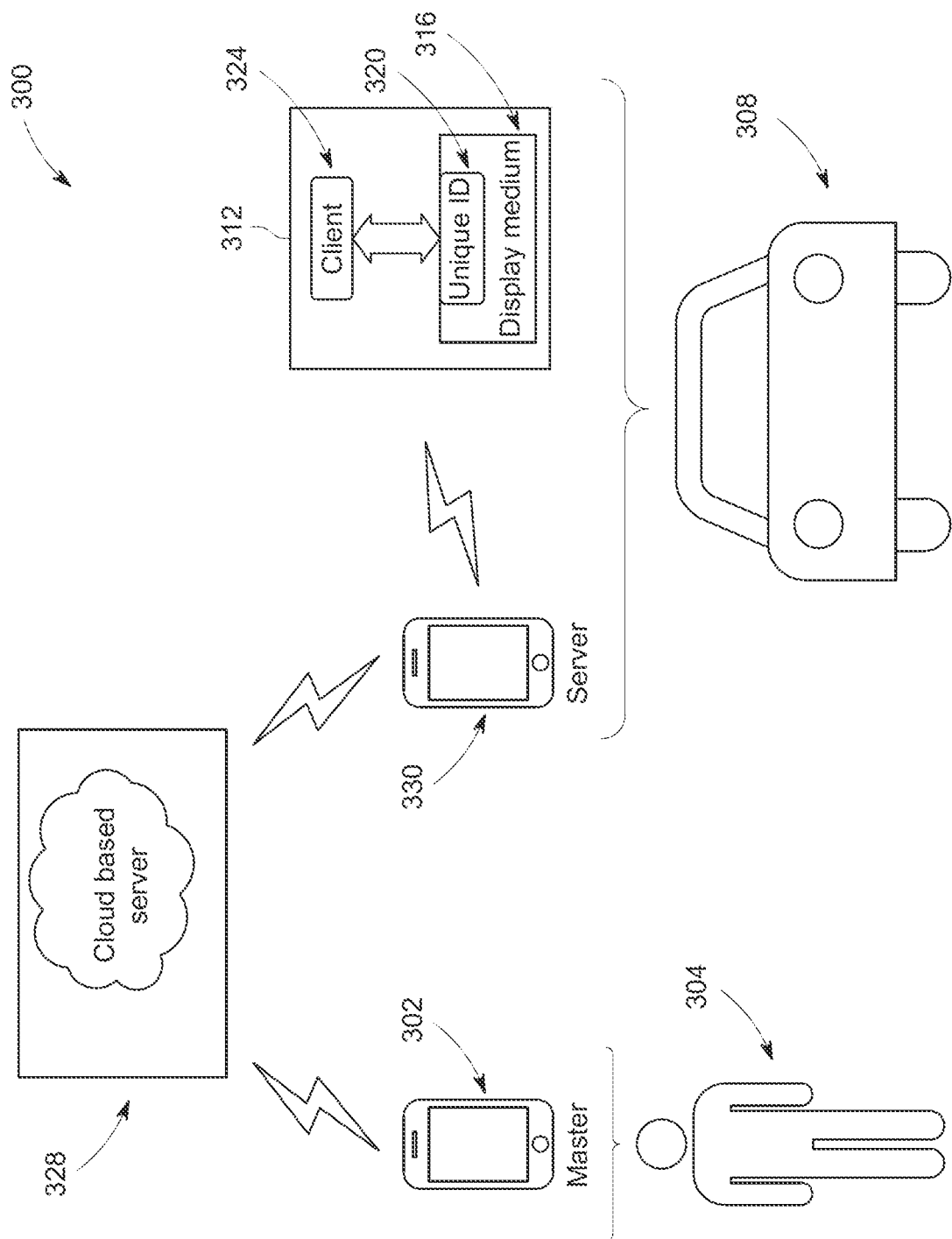
FIG. 3 is a schematic depiction of a communication protocol between an individual rider and a designated vehicle in accordance with an embodiment of the present invention.

An example of a system 300 for the secure communication protocol between a requesting rider 304 and a designated vehicle 308 is depicted in FIG. 3. The protocol is designed so that only genuine requests to display content from authorized parties are honored. A display unit 312 includes a display medium 316 having a unique ID 320, such as a serial number, and a client 324, such as a Blue Tooth radio. Preferably, client 324 has a unique MAC (Media Access Control) ID number.

Requesting rider 304 enters a message for display via a local master device 302, such as a smart phone. Master device 302, via a TNC app and an internet connection, sends the message to be displayed to a secure cloud-based server 328. Designated vehicle 308 is identified by the TNC to pick up rider 304 at the designated pickup area. Designated vehicle 308 is equipped with display unit 312. A second server 330, such as a smart phone of the driver of designated vehicle 308, is associated with designated vehicle 308 and receives the message sent by rider 304 and relays it to display unit 312 for display by display medium 316, such as an array of LED (Light Emitting Diode) matrices or LCD (liquid crystal display) units.

An exemplary communication protocol between rider 304 and display unit 312 is as follows:
  a. Rider 304 enters a message via master device 302 and sends it to the cloud-based server 328.
  b. Cloud-based server 328 validates a request from master device 302, identifies MAC ID of the target server collocated with verified designated vehicle 308, and sends the total message (i.e., the message requested by the rider message as well as the MAC ID) to server 328.
  c. Server 330 receives the total message (encrypted or non-encrypted) from cloud-based server 328, extracts the rider message to be displayed and transmits the rider message (via wired or wireless means) to client 324, which is connected to display medium 316 (via wired or wireless means).
  d. Client 324 sends the rider message to be shown in the correct format and mode (e.g., scrolling mode, display intensity, scrolling direction, etc.) to display medium 316.

e. Display unit 312 does not know if the message from server 330 is authentic, so display unit 312 challenges client 324 with a unique ID number 320, such as a serial number saved on display unit 312.
f. If client 324 matches the challenge, then display medium 316 will display the rider message properly.
g. If client 324 does not match the challenge, then display unit 312 will deny service to the user. This is an added security layer to prevent any possible unauthorized intrusion on client 324 of display unit 312 from other devices.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for displaying user-selected information on a designated vehicle, the system comprising:
   a user interface, wherein a prospective rider enters a ride request and a display content into the user interface, and wherein the display content is created by the prospective rider and is specific to the ride request;
   a display unit on the designated vehicle, the display unit having a unique identification number, a display medium, and a client; and
   a server associated only with the designated vehicle and in communication with a cloud-based server,
   wherein the server is in communication with the client,
   wherein, when the ride request results in the designated vehicle being selected and accepted to fulfill the ride request, the client receives the display content from the server and requests the display device medium to display the display content,
   wherein the display unit, upon receiving the display request, sends the client a challenge including the unique identification number to match, and
   wherein, if the client matches the challenge, the display medium displays the display content such that the display content is viewable from outside the designated vehicle for at least a portion of a time period between when the ride request is entered and when the ride request is fulfilled, and, if the client does not match the challenge, the display medium will not display the display content.

2. The system of claim 1, wherein the display content is an image of the prospective rider.

3. A system for displaying information from a vehicle, the system comprising:
   a display unit having a unique identification number, a client, and display medium and being attached to a designated vehicle, wherein information displayed on the display medium is visible to observers outside the designated vehicle;
   a transportation application linked to server associated only with the designated vehicle, the transportation application including a set of instructions for:
   receiving a ride request from a user;
   receiving user-created content for display from the user, wherein the user-created content is specific to the ride request;
   selecting the designated vehicle to fulfill the ride request based on the ride request; and
   sending the user-created content to the server,
   wherein the server sends the user-created content to the client and the client sends a request to the display medium to display the user-created content,
   wherein the display unit sends a challenge including the unique identification number to the client to match, and
   wherein, when the client matches the challenge, the user-created content is displayed on the display medium of the selected designated vehicle for at least a portion of a time period between the receiving of the ride request and fulfilling the ride request.

4. The system of claim 3, wherein the display unit includes a heads up display (HUD) and a mirror configured to reflect the user-created content from the HUD such that the user-created content is visible to and oriented properly for observers outside the designated vehicle.

5. The system of claim 3, wherein the user-created content is an image of the user.

6. The system of claim 3, wherein the server is a smart phone associated with an operator of the designated vehicle.

7. The system of claim 5, wherein the display medium is an LED display matrix and the LED display matrix displays scrolling text of the user-created content.

8. A method of displaying information on a ride request fulfillment vehicle to facilitate fulfillment of a user-requested ride comprising:
   receiving a ride request from a prospective rider;
   receiving content for display from the prospective rider, wherein the content is created by the prospective rider to be displayed on the ride request fulfillment vehicle and is specific to the ride request;
   selecting a vehicle to fulfill the ride request based on the ride request;
   sending the content to a server associated only with the selected vehicle;
   sending a request to display the content from the server to a client of a display unit having a display medium;
   sending, in response to the request, a challenge including a unique identification number associated with the display unit from the display unit to the client to match; and
   displaying, only if the client matches the challenge, the content on the display medium on the selected vehicle for at least a portion of a time period between the receiving of the ride request and fulfilling of the ride request.

* * * * *